United States Patent Office 3,450,555
Patented June 17, 1969

3,450,555
TREATMENT OF TEXTILE FIBERS WITH SOLUBLE POLYMERIC ALCOHOL DERIVATIVES
Douglas J. Bridgeford, Danville, Ill., assignor to Tee-Pak, Inc., a corporation of Illinois
No Drawing. Continuation-in-part of applications Ser. No. 200,621, June 7, 1962, and Ser. No. 416,795, Dec. 8, 1964. This application Dec. 8, 1966, Ser. No. 600,020
The portion of the term of the patent subsequent to Aug. 8, 1984, has been disclaimed
Int. Cl. D06m 15/04, 1/00
U.S. Cl. 117—62  16 Claims

ABSTRACT OF THE DISCLOSURE

Textile fibers are treated with solutions of decausticized polymeric alcohol xanthates to provide coatings of regenerated polymeric alcohols or derivatives thereof on the fibers. The treatment may be applied to finished fabrics of cotton or rayon to size the fibers or may be applied to fabrics or fibers of synthetic polymers such as nylon, polyesters, etc., to provide an anti-static or soil-resisting coating. The treatment is also effective to bind together fibers in a non-woven fabric. The treating solution is preferably a decausticized viscose or a solution reconstituted from a spray-dried decausticized cellulose xanthate.

CROSS REFERENCE TO RELATED APPLICATIONS

This application is a continuation-in-part of my copending United States patent applications Ser. No. 200,621, filed June 7, 1962, now U.S. Patent No. 3,291,789, and Ser. No. 416,795, filed Dec. 8, 1964.

BACKGROUND OF THE INVENTION

Viscose has been known as an intermediate in the preparation of cellulose compositions for about 70 years. Cellulose xanthate was discovered by Cross and Bevan in 1892 and is prepared by the reaction of carbon disulfide with alkali cellulose. A dilute aqueous alkaline solution of cellulose xanthate is known as viscose and consists of a mixture of sodium cellulose xanthates of varying molecular size, loosely combined with sodium hydroxide and dispersed in the solution together with alkalization and xanthation by-products.

In commercial production, viscose is allowed to age until it reaches the desired ripeness and is then extruded through a die into a coagulating and/or regenerating medium (e.g., ammonium sulfate and/or sulfuric acid) to regenerate cellulose having the configuration of the die through which the viscose was extruded. If the viscose is extruded through a fine hole, a filament of rayon is produced. If the viscose is extruded through a narrow slit, a film of regenerated cellulose is produced. If the viscose is extruded through a thin annular opening, a tubular film of regenerated cellulose is produced which may be used as an artificial sausage casing. Viscose has also been used for impregnating paper or fabric (including non-woven fabrics and webs) for regenerating cellulose therein by subsequent treatment with acid.

Attempts have also been made to regenerate viscose thermally to avoid the necessity for acid resistant equipment which is required in acid regeneration processes. The acid regeneration of viscose and the thermal regeneration of viscose both result in the formation of large amounts of salts and other undesirable by-products similar in weight to the cellulose which necessitate extensive washing and purification of the regenerated cellulose.

Polymeric alcohols, including carbohydrates and polysaccharides, such as starch, amylose, dextran, sugars, polyvinyl alcohol, polyallyl alcohol, etc., are known to form alkali derivatives from which the corresponding xanthates can be prepared by reaction with carbon disulfide. The purification of these materials and regeneration of products therefrom present economic and technical problems which are similar to the purification and regeneration of cellulose from viscose.

In D. J. Bridgeford U.S. patent application, Ser. No. 200,621, filed June 7, 1962, there are described several inexpensive processes for decausticizing various polymeric alcohol xanthates. In that patent application, there are described processes in which alkaline solutions of various polymeric alcohol xanthates are decausticized by dialysis or by treatment with ion exchange or ion retardation materials.

Solutions of polymeric alcohol xanthates which have been decausticized as described in said Bridgeford patent application are especially useful as wet and dry strength additives for paper and for various other purposes, such as the treatment of textile fibers. Decausticized polymeric alcohol xanthate solutions can be regenerated into films or filaments or tubular casings by treatment with acid and/or by thermal regeneration. These decausticized solutions, however, contain such a high proportion of water that it has been uneconomical to manufacture such solutions for commercial use at any location other than the place at which the xanthate solution was prepared. Also, it has been found that decausticized xanthate solutions tend to decompse, lose xanthate sulfur, and gradually become insoluble after storage for extended periods of time. The decomposition of the xanthate groups is accelerated at higher temperatures. It has thus been necessary to refrigerate decausticized polymeric alcohol xanthate solutions if they are to be stored for any extended period of time.

While the decausticized polymeric alcohol xanthate solutions described in said Bridgeford patent application are useful for a variety of purposes, the problems of storage and cost of shipping excessive amounts of water have retarded the commercial use of these materials. It has been considered highly desirable to find some economic means to convert these materials into a dry, solid form which is stable for extended periods of storage and which can be reconstituted by mixture with or dispersion in water or other solvent.

In the preparation of viscose and other polymeric alcohol xanthates, many undesired by-products are formed. In the past, viscose and other polymeric alcohol xanthate solutions have been regenerated by treatment with an acid with the result that large amounts of salts are formed within the regenerated material. It was previously considered impractical to reduce the proportion of salts in the regenerated polymeric alcohol product by neutralization of the aqueous caustic solutions due to the fact that any attempt to neutralize excess caustic with acid would result in a localized region of very low pH and high salt concentration which would tend to coagulate the polysaccharide and produce a heterogeneous product.

In D. J. Bridgeford U.S. patent application, Ser. No. 200,621, it is reported that polymeric alcohols, principally film-forming carbohydrates or polysaccharides, such as cellulose, starch, amylose, dextran, etc., in the form of their caustic xanthate solutions, can be decausticized by dialysis, ion exchange, and/or ion retardation. The various procedures for decausticization of various xanthate solutions are described in considerable detail in that patent application.

In D. J. Bridgeford U.S. patent application, Ser. No. 416,795, it is reported that decausticized solutions of polymeric alcohol xanthates, such as cellulose, starch, amylose, dextran, sugars, polyvinyl alcohol, polyallyl alcohol, etc., can be converted to finely divided, solid, stable products by spray drying. The decausticized solutions (which have been decausticized to a pH less than 13) are subjected to spray drying using a large valume of very dry heated air, at a temperature of at least 38° C. to produce a powdered polymeric alcohol xanthate product which is substantially dry and has a D.S. of at least 3%.

The term D.S. as used herein refers to the degree of substitution of the polymeric alcohol expressed as a percentage of available groups capable of substitution which are in fact substituted with the xanthate radical. Thus, a polyvinyl alcohol xanthate having a xanthate group for every ten vinyl groups would have a D.S. of 10%. A cellulose xanthate, however, containing one xanthate group for every ten anhydroglucose groups would have a D.S. of 3⅓% because cellulose can contain up to three xanthate substituents per anhydroglucose unit.

It was found that the dry decausticized xanthate powders which can be prepared in this manner can be dissolved or dispersed in water and other solvents or swell sufficiently upon admixture with water to be useful as additives in the formation of paper webs, and in the treatment of textile fibers for sizing and other purposes.

It was most unexpected that decausticized xanthate solutions could be spray dried. Viscose is much more stable on extended storage, both at low and elevated temperatures, than is a solution of decausticized cellulose xanthate of the same cellulose content. Viscose, however, was found to be extremely unstable in spray drying. In fact, viscose loses most of its xanthate groups during spray drying and yields a substantially insoluble product. The sodium hydroxide present in viscose is quite damaging to the dried product. Sodium hydroxide is somewhat hygroscopic and thus more water is retained (making the product less stable) in spray dried viscose. Also, the sodium hydroxide present in spray dried viscose attacks cellulose and depolymerizes it.

The spray drying of decausticized polymeric alcohol xanthates can be accomplished using any of the several types of spray dryers which are in commercial use. Spray dryers which can be used in this process include the mixed flow type, horizontal-concurrent type, vertical up flow countercurrent type, vertical down flow concurrent type, and vertical up flow concurrent type, although other commercial spray dryers can be used. In the spray drying of decausticized xanthate solutions, the solution is sprayed into a large volume high velocity stream of heated air or other inert gas. Air temperatures of at least 38° C. are required for effective drying and temperatures of the order of 2690° C. can be used without excessive decomposition of the product. In fact, with proper adjustment of air flow rates and efficient product collection, it is possible to use air temperatures as high as 316° C. to 420° C.

It should be noted that even where high air temperatures are used the temperature surrounding each particle being dried is approximately the wet bulb temperature of the drying gas and thus the product is not subjected to temperatures substantially above the boiling point of water.

It is, therefore, one object of this invention to provide new and improved textile products treated with polymeric alcohol derivatives.

Another object is to provide new and improved textile products containing a polymeric alcohol derivative thereof prepared from a decausticized polymeric alcohol xanthate.

Still another object is to provide new and improved non-woven fabrics containing a novel textile fiber binder.

A feature of this invention is the provision of new and improved textile products containing polymeric alcohols or derivatives thereof introduced in the form of a solution of a decausticized polymeric alcohol xanthate which is subsequently insolubilized within the textile as a coating and impregnant on the fibers thereof.

Still another feature of this invention is the provision of an improved textile product containing a polymeric alcohol or derivative thereof introduced by treatment of the fibers or the finished textile product with a solution of a polymeric alcohol xanthate decausticized to a pH less than 13 and subsequently insolubilized within and on the surfaces of the textile fibers.

Still another feature of this invention is the provision of an improved nonwoven textile fabric wherein the fibers are bonded by treatment with a solution of a polymeric alcohol xanthate decausticized to a pH less than 13 and subsequently insolubilized to bind the fibers together.

Other objects and features of this invention will become apparent from time to time throughout the specification and claims as hereinafter related.

SUMMARY OF THE INVENTION

This invention comprises new and improved textile products containing polymeric alcohols or derivatives thereof introduced into the textile fibers in the form of a decausticized solution and subsequently insolubilized therein.

The decausticized xanthate solutions which are prepared as described in the aforementioned copending patent applications of D. J. Bridgeford and the decausticized xanthate solutions which are reconstituted from the spray dried decausticized xanthate powders have been found to be especially useful as additives in the treatment of textile fibers, yarns, and finished textile products, of fibers such as cotton, rayon, and synthetic polymers such as polyesters, nylon, etc., to coat the fibers to provide improved soil resistance and anti-static properties, and to provide a sizing action in the case of cotton and rayon, and to provide a binding action in the manufacture of nonwoven fabrics. The xanthate solutions may be used to impregnate textile fibers, yarns or fabrics followed by regeneration of cellulose on the surface of and within the fibers by heat or by treatment with acid. The fibers or yarns or fabrics which are treated are non-woolen fibers, such as cotton, rayon, or synthetic polymer fibers, such as nylon, polyesters, etc. The fibers, yarns, or fabrics may be passed through a solution of the decausticized xanthate and the cellulose or other polymeric alcohol regenerated on the fibers by thermal treatment or by treatment with acid or precipitated as a xanthide film on the fibers by oxidation or by treatment with a polyvalent metal cation. In the manufacture of nonwoven fabrics, the textile fibers are air laid or fluid laid as a web and the web then treated with a solution of the decausticized xanthate. After regeneration of the cellulose or other polymeric alcohol from the xanthate solution or precipitation of a polymeric alcohol xanthide, the fibers of the web are bonded together as a nonwoven fabric.

DESCRIPTION OF THE PREPARATIONS OF DECAUSTICIZED XANTHATE MATERALS USED IN TREATMENT OF TEXILE FIBERS

The following nonlimiting examples are illustrative of the preparation of the decausticized xanthate materials used in the preparation of the novel textile products which comprises this invention and are also illustrative of the process of preparation of such products and of the resulting products:

Example 1

A commercial viscose solution is purified by a batch dialysis technique and converted to a decausticized, dry, stable powder by spray drying.

The viscose used is a commercial viscose solution, ripened, and ready for extrusion and containing about 8% cellulose, 6.6% total alkali (total of free sodium hydroxide and combined sodium in the cellulose xanthate), 1.10% xanthate sulfur, and having a D.P. of about 500 (D.P. is the degree of polymerization and represents the average number of anhydroglucose groups per cellulose molecule).

The viscose is diluted to a 4% cellulose content and 600 ml. of the dilute viscose is placed in a bag of regenerated cellulose film. The dialysis bag which is used in this example consists of a 72-inch length of 0.8-in. diameter tubing of regenerated cellulose film, tied at both ends. The bag of diluted viscose is placed in a 9-liter bottle and the bottle filled with distilled or deionized water. The bottle is shaken for about 20 min. at 15° C. on an Eberbach shaker at 150 cycles per min. The water is decanted and the bottle again filled with fresh water and shaken for a 1-hour period at 15° C. After two additional changes of water the dialysis is complete.

At this point, the dialyzed viscose is removed from the bag and diluted to a 2% cellulose content to produce a viscous liquid having a pH of 11.

The dialysis procedure is repeated several times until 5 gallons of 2% cellulose content, decausticized (pH 11), viscose is obtained. The decausticized viscose is fed through a commercial mixed flow spray dryer. The solution is atomized into the dryer and contacted with a high velocity heated air. In this drying operation the air inlet temperature is 130° C. and the air outlet temperature is 60° C. The rapid drying of the atomized droplets of decausticized viscose results in the production of a dry powder having a water content less than 5%. The individual particles are in the form of hollow spheres and range from submicron size up to a few balloons of 30 to 60 microns in diameter. The average size of the hollow spheres is about 10 microns. The product which is obtained has a xanthate sulfur content of about 12.5% on cellulose and a D.P. which is substantially the same as the viscose feed stock. The dry powdered product is stable against xanthate decomposition for several days at room temperature and almost indefinitely when refrigerated to 0° C. The product has a pH less than 13 when dissolved or dispersed in water at 1% concentration and a D.S greater than 3%.

In this example aged or ripened viscose was used. In other experiments unaged or unripened, blender viscose was used with similar results. In fact, when blender viscose is used, both the feed and product xanthate sulfur contents are higher and the product more easily redissolved in water. If desired, the process can be carried out with specially prepared high xanthate viscose, having a xanthate D.S. in the range from 50 to 100% (i.e. 1.5 to 3.0 xanthate groups per anhydroglucose unit).

Example 2

In another experiment, the dialysis of viscose was carried out using an acid form cation exchange resin to maintain a high concentration gradient through the dialysis membrane to reduce the quantities of water required for the dialysis. A 60-in. long tube of regenerated cellulose was tied at one end to form an elongated bag. At the end of the bag was placed about 20 g. Amberlite I.R.C. 50 H (a carboxylic exchange resin in the acid form) and 50 ml. of water. The casing was then tied and additional amounts of water and ion exchange added and the bag again tied. This arrangement was repeated until a string of five batches of resin and water were obtained. This dialysis membrane containing acid form cation exchange resin beads was then placed in a wide mouth bottle containing 500 g. of viscose having a 4% cellulose content, produced by dilution of 8% cellulose content commercial blender viscose. The bottle was stoppered and shaken at 320 cycles per min. for 2½ hours. The shaker bed was maintained at a temperature of about 32° C. When the dialysis was complete, the dialysis membrane was removed from the bottle and the decausticized viscose solution which remained had a pH of 11.4. The dialyzed viscose which was thus produced was a viscose liquid of just barely pourable viscosity. The increase in viscosity was partially caused by decausticization but was also due to a ripering of the diluted viscose as a result of being held at a temperature of 32° C.

The procedure just described is repeated and the product diluted to produce about 5 gallons of 2% cellulose content solution. The decausticized viscose solution is fed into a commercial concurrent down flow type spray dryer. The decausticized viscose is atomized into the dryer and mixed with heated air. The air inlet temperature is 146° C and the outlet temperature 107° C. As previously described, the evaporation of water from the atomized droplets of decausticized viscose maintains the surface temperature of the droplets sufficiently low to prevent excessive decomposition of the cellulose Xanthate.

The product which is obtained is a finely divided, dry (moisture content less than aobut 5%), stable solid. The individual particles are spherical in shape and have an average diameter of about 10 microns. The product has a xanthate sulfur content of about 15% on cellulose and is easily dissolved in water. This product is stable for several days at room temperature and almost indefinitely under refrigeration.

The solid, stable, finely divided sodium cellulose xanthate produced in Examples 1 and 2 easily dissolved in water to produce a solution which can be used for a variety of purposes. The reconstituted solution can be regenerated as a film or filament by conventional acid treatment or by thermal decomposition. The solution is very effective for treating textile fibers, yarns, or finished textile products to coat the individual fibers with cellulose to size the fibers or fabrics or to provide a cellulose coating which provides improved resistance to soil and anti-static properties (in the case of synthetic polymer fibers). The solution is also effective for treating air-laid or fluid-laid webs of textile fibers which are laid down in preparation for the manufacture of nonwove fabrics. When such a web is treated with the solution and cellulose regenerated by acid treatment or by thermal decomposition of the cellulose xanthate, the regenerated cellulose is effective to bind the individual fibers together to produce a nonwoven fabric.

Example 3

In this and subsequent examples, the preparation of various spray dried polymeric alcohol xanthates is described.

A high purity amylose (derived from corn) containing about 10% water and having a D.P. of about 700–900 is used in the formation of an alkyl amylose xanthate solution similar to viscose.

An alkaline solution of 24% concentration (1580 g. water and 300 g. sodium hydroxide) was prepared and mixed with 300 ml. methanol and 150 g. amylose. The slurry which was formed was stirred for 10 min. and 200 ml. additional methanol added, and the more dilute slurry stirred for 1 hour at 25° C. At that time, 5.1 liters of methanol were added to precipitate and shrink the amylose. The supernatant layer was decanted and found to contain 270 g. of sodium hydroxide. The gel which remained was allowed to dry in thin layers and to depolymerize or age.

The alkyl amylose which was produced was dried and aged for 43 hours at 25° C. to permit the preparation of relatively high concentration alkali amylose xanthate solutions. The gel weight was about 870 g. and comprised 12.6% alkali, 16% amylose, and 71% water.

The alkali amylose (870 g.) was spread on the bottom and on the porcelain plate of a 12-in. vacuum desiccator. Nitrogen purging was carried out and a vacuum was then applied. About 70 g. of carbon disulfide was drawn into the desiccator and the system allowed to stand in a water bath at 25° C. After about 5.25 hours, the alkali amylose had turned to a carrot yellow-orange color. The vacuum was applied to the desiccator to remove excess carbon disulfide for a period of about 20 min. The product obtained consisted of 898 g. of sodium amylose xanthate. This material was refrigerated at −20° C. for 6 days before solutions were prepared from it.

A solution was prepared by mixing the sodium amylose xanthate with an equal weight of water for 2 hours using a 2½-in marine type propeller as an agitator. The mixture was maintained at a temperature less than 15° C. during solution. The viscous xanthate solution was filtered through a muslin filter cloth and had a 6% alkali content (both free sodium hydroxide and combined sodium) and 8% amylose.

The amylose xanthate solution was diluted to a 2% amylose content and was decausticized by dialysis. The dialysis was carried out using the procedure described in Example 1 and produced a decausticized solution having a pH of 11.5.

A 2% decausticized solution of amylose xanthate, prepared as described above, is fed to a commercial downflow counter-current-type spray dryer. The amylose xanthate solution is sprayed into the dryer countercurrently to the flow of heated air. The air has an inlet temperature of 149° C. and an outlet temperature of 104° C. The air stream passing out from the dryer is passed through a secondary separation system for recovery of fines which are combined with the coarser product removed from the bottom of the spray dryer. The product which is produced consists of a stable, dry solid comprising essentially decausticized sodium amylose xanthate. The product consists of very small, hollow spheres ranging from submicron size up to balloons in the range of 30 to 60 microns in diameter and has an average particle size in the range of 5 to 20 microns.

This product has a xanthate sulfur content equal to about 75% of the xanthate sulfur content of the feed solution. The amylose xanthate powder is easily dissolved in water to produce viscous solutions which are useful in the formation of regenerated amylose films and fibers. The reconstituted amylose xanthate solutions are also useful as adhesives for wood and paper, as wet and dry strength additives for paper, and for treatment of textile fibers, yarns and fabrics. The powdered amylose xanthate product is stable for extended periods of time. If the powder is given an additional drying with extremely dry air at room temperature or by admixture with a desiccant material to reduce the water content to substantially zero, there is substantially no loss of xanthate sulfur during storage at room temperature for several months.

Example 4

In this example, dilute sodium polyvinyl alcohol xanthate is decausticized and converted to a dry stable powder.

The sodium polyvinyl alcohol xanthate used in this example is prepared in accordance with the procedure of B. G. Ranby, described in Die Makromolekulare Chemie, November 1960, p. 68ff. The sodium polyvinyl alcohol xanthate is diluted to a 2% polyvinyl alcohol content and purified by dialysis following the procedure described in Example 1. The dialyzed solution is a viscous liquid of pH 11.

The decausticized solution of sodium polyvinyl alcohol xanthate is then passed through a commercial concurrent up-flow spray dryer. The solution is atomized into the dryer into a stream of heated air. The air has an inlet temperature of about 163° C. and an outlet temperature of 104° C. Under these conditions, the spray is converted to a finely-divided dry powder and recovered in the product collection system.

The sodium polyvinyl alcohol xanthate powder consists of hollow spherical particles ranging from submicron size to balloons having diameters of the order of 30 to 60 microns. The powder is stable on extended storage and is easily redissolved in water. A reconstituted solution of decausticized sodium polyvinyl alcohol xanthate is a viscous liquid which can be regenerated as a film or fiber and which is useful as an adhesive or as a wet and dry strength additive for paper, or as a treatment for textile fibers, yarns, or fabrics providing anti-static properties in synthetic polymer fibers, for sizing cotton or rayon fibers, or for binding the fibers in a nonwoven fabric.

Example 5

In this example, dilute sodium polyallyl alcohol xanthate is decausticized and converted to a dry, stable powder.

The sodium polyallyl alcohol xanthate used in this example is prepared in accordance with the procedure of B. G. Ranby, described in Die Makromolekulare Chemie, November 1960, p. 68ff. The sodium polyallyl alcohol xanthate is diluted to a 2% polyallyl alcohol content and purified by dialysis following the procedure described in Example 1. The dialyzed solution is a viscous liquid of pH 11.

The decausticized solution of sodium polyallyl alcohol xanthate is then passed through a commercial horizontal concurrent flow type dryer. The solution is atomized into the dryer into a stream of heated air. The air has an inlet temperature of about 163° C. and an outlet temperature of 104° C. Under these conditions, the spray is converted to a finely divided powder and recovered in the product collection system.

The sodium polyallyl alcohol xanthate powder is finely divided and consists of hollow spherical particles ranging from submicron size to balloons having diameters of the oreder of 30 to 60 microns. The powder is stable on extended storage and is easily redissolved in water. A reconstituted solution of decausticized sodium polyallyl alcohol xanthate is a viscous liquid which can be regenerated as a film or fiber and which is useful as an adhesive or as a wet and dry strength additive for paper, or as a treatment for textile fibers, yarns, or fabrics as described in the previous examples.

SPRAY DRYING OF XANTHATE SOLUTIONS DECAUSTICIZED BY CATION EXCHANGE

Viscose and analogous polymeric alcohol xanthate solutions can be purified and reduced in pH by treatment with cation exchange materials in the hydrogen ion or acid form. The free alkali in viscose (and related polymeric alcohol xanthate solutions) and a substantial portion of the combined alkali can be removed by neutralization with a cation exchange material in the hydrogen ion or acid form. In general, the reaction is carried out by merely mixing the viscose (or other xanthate solution) with the cation exchange resin which results in a rapid reaction removing most of the basic impurities.

Reaction which takes place is a simple neutralization reaction, is quite rapid, and seems to be limited only by the rate of diffusion of the alkali into contact with hydrogen ions diffusing from the ion exchange material. While the process is most effective when used with commercially-obtainable, high capacity ion exchange resins, it is effective to a substantial degree with any material having cation exchange properties, which material can be converted to the acid form by treatment with acid. In general, the neutralization of free alkali (and part of the combined alkali) in polymeric alcohol xanthate solutions can be carried out using cation exchange materials in a definite and predetermined manner with the result that the pH of the resulting material can be calculated in advance by an evaluation of the stoichiometry of the reaction.

The following ion exchange materials are illustrative of the cation exchangers which can be used in this process: sulfonated phenolic resins, e.g., Zeo-Karb 215, Zeo-Karb 315, Amberlite IR1, Amberlite IR100, Duolite C10, Duolite C3, Dowex 30; sulfonated polystyrenes, e.g., Zeo-Karb 225, Amberlite IR120, Duolite C20, Dowex 50, and Nalcite HCR; sulfonated coal, e.g., Zeo-Karb H1; nuclear substituted phosphonate resins, e.g., Duolite C60 and Duolite C61; carboxylic resins, e.g., Zeo-Karb 216, Zeo-Karb 226, Amberlite IRC50, Duolite CS100; acid treated zeolites; naturally occurring non-resinous ion exchange materials, e.g., cellulose, wood fibers (bast fiber) including fabricated forms thereof such as webs, papers, fabrics, and the like. The reference to ion exchange resins is intended to be generic to ion exchange material of the high capacity resinous type, to liquid ion exchangers, and to naturally occurring non-resinous materials such as acid treated coal, cellulose wood fibers, fabrics, webs, papers, and the like which are known to have cation exchange properties.

When polymeric alcohol xanthate solutions are treated with ion exchange materials to neutralize free alkali (and sometimes part of the combined alkali), the resulting solution has a pH less than 13 and is capable of being spray dried as will be subsequently described. When a polymeric alcohol xanthate solution is decausticized to a pH less than about 9, some of the combined alkali is removed and the resulting product contains some acid xanthate groups. Consequently, when the product solution or the ultimate spray dried powder is referred to as a polymeric alcohol xanthate, the term is intended to be inclusive of acid xanthates (sometimes referred to as xanthic acids) of the specified polymeric alcohol in which some or all of the combined alkali has been removed. When a xanthate solution is decausticized to a pH of about 6–7 and spray dried, there is a substantially complete removal of non-xanthate sulfur, e.g. trithiocarbonates, sulfides, etc., from the product which is obtained. Non-xanthate sulfur compounds can also be removed from xanthate solutions by decausticizing to pH 6–7 and sparging with an inert gas.

The following non-limiting examples are illustrative of the preparation of stable, dry powders of polymeric alcohol xanthates by spray drying of xanthate solutions which have been neutralized or decausticized by cation exchange:

Example 6

An 80% cellulose content viscose, as used in Example 1, was diluted with distilled water to a 0.5% cellulose content. Amberlite IRC50H resin beads were added intermittently to the diluted viscose with mechanical stirring over a period of about 10 min. at 25° C. until the pH reached a value of about 8. A clear, light-amber colored liquid resulted. The liquid was filtered through a muslin filter cloth and had a viscosity of 5.1 cp. at high shear rates and 7.8 cp. at low shear rates.

The decausticized viscose, prepared as described above, is fed into a concurrent or parallel flow, up-flow type spray dryer. The solution is atomized into a stream of hot air and rapidly converted into a dry stable powder. The air is supplied to the dryer at an inlet temperature of 144° C. and an outlet temperature of 104° C.

The product obtained from the spray drying operation is substantially dry (moisture content less than about 3%), stable sodium cellulose xanthate (including some xanthic acid groups). The xanthate sulfur content of the product is about 75% of that of the feed to the dryer. The drying operation results in a very slight loss of xanthate sulfur but produces a dry, stable powder which can be stored for extended periods of time at room temperature and almost indefinitely under refrigeration. The sodium cellulose xanthate powder is easily redispersed in water to form a sodium cellulose xanthate solution from which films or fibers can be regenerated or which may be used as an adhesive or a wet or dry strength additive for paper, or for treating textile fibers, yarns, or fabrics as described in the previous examples.

Example 7

In an additional series of experiments, viscose containing higher proportions of cellulose was treated with a cation exchange resin by passing the viscose through a column of resin designed for pressure operation. The column consisted of a 2-in. (O.D.) x 30-in. stainless steel tube provided with end caps having O-ring seals and 100-mesh stainless steel screens backed by 14-mesh screens for supporting the resin bed. In using the column, coarse glass wool was first placed over the screen and the bottom of the column. A portion of Amberlite IRC50H resin was pretreated with water to prevent excessive compacting of the resin due to swelling on initial wetting. The moist resin was added to the column and tamped to minimize channeling during the ion exchange reaction.

In one experiment the column was partially filled with 150 g. of Amberlite IRC50H resin. 600 g. of 2% cellulose content viscose was added to the column. The pressure on the column was gradually increased to 30 p.s.i.g. over about 5 minutes. 600 g. of decausticized viscose was eluted from the column in 3 minutes after the pressure reached 30 ps.i.g. The initial effluent from the column had a pH of 5.5. The final effluent from the column had a pH of about 8.4 which increased to 9.0 after about 4 hours' storage.

In other experiment the column was charged with 100 g. of Amberlite IRC50H covered with a 0.75-in. layer of Amberlite IRC50Na. Next, 547 g. of 3% cellulose content viscose was introduced to the column and a pressure of about 60 p.s.i.g. applied. At the end of about 30 minutes, 540 g. of the viscose had been recovered. The initial effluent from the column had a pH of 5.0 which rose to 8.5 after the first 50 ml. The pH of the viscose remained at about 8.5 until completely eluted from the column and gradually increased to a value of 9.8 after about 3 hours at 25° C.

In other experiment a column was charged with 100 g. of Amberlite IRC50H covered with a 0.5-in. layer of Amberlite IRC50Na. Then 700 g. of 2.5% cellulose content viscose was added to the column and a pressure of 55 p.s.i.g. applied. The entire 700 g. of viscose was eluted from the column in about 4.5 min. and had a pH of 12.5.

In other experiments, dilute viscose solutions (0.5% cellulose content) were passed through the column under gravity feed and under various pressures to produce decausticized viscose solutions of pH varying from 5 to 10.

Decausticized viscose solutions, prepared as just described, are spray dried using the apparatus described in Example 6 above. The viscose solution, in each case, is atomized into a stream of heated air. The air stream has inlet temperature of about 149° C. and an outlet temperature of about 104° C. As previously described, the evaporation of water from the individual droplets of solution maintains the surface temperature of the droplets (and the resulting solid particle) at a temperature not substantially in excess of the wet bulb temperature of the gas stream. The spray drying of the decausticized viscose solutions produces finely divided powders of sodium cellulose xanthate. The powder is a dry (moisture content less than about 3%) stable, solid material in the form of hollow spheres having diameters ranging from sub-micron size up to 60 microns in diameter. The dry solid product is stable for several days at room temperature and almost indefinitely under refrigeration. If the dry powder is dried further to remove substantially all of the water, the product can be stored almost indefinitely at room temperature.

The sodium cellulose xanthate powder produced as just described is easliy dissolved in water to reconstitute a decausticized viscose solution. The solution thus prepared is useful as an adhesive for paper or wood and as a wet or dry strength additive for paper, or for treating textile fibers, yarns, or fabrics for providing soil resistance and anti-static properties to synthetic polymer fibers, for sizing cotton and rayon fabrics, and for binding together the fibers of nonwoven fabrics.

Example 8

In another experiment, a 0.8% cellulose content viscose was mixed with Dowex 50WX8 sulfonic acid type resin in the hydrogen ion or acid form. The mixture was stirred for a few minutes and the decausticized solution recovered. The solution had a pH of 11.5 and did not coagulate or gel after storage for 24 hours at room temperature.

When this solution is syray dried as described in the previous example, a solid stable powder is obtained which is easily redissolved in water at the time and place of intended use.

Example 9

The composition of viscose (or similar polymeric alcohol xanthate solutions) which has been decausticized by cation exchange cannot be simply defined. The viscose starting material contains at least ten types of molecular species, many of which are in transient equilibrium. Ion exchange will, in general, shift these equilibria to give the free acids. The nature of the products also depends somewhat upon the speed of the ion exchange reaction or the contact time with the resin. This is because of the fact that, while the free sodium (or other alkali) ions in the viscose are being neutralized by the ion exchange to produce cellulose xanthic acids (also called cellulose acid xanthates), the resulting product will hydrolyze to produce additional amounts of free alkali. However, this hydrolysis takes time and the composition of the resulting product, therefore, varies somewhat with the time required for the neutralization or ion exchange reaction. The composition of the decausticized viscose also depends to some extent upon the time that it has been stored.

In a series of experiments, a 0.5% cellulose content viscose was neutralized or decausticized by treatment with Amberlie IRC50H resin and samples obtained in a pH range from 9.3 down to 6.5.

Analysis of the decusticized viscose having a pH of 6.9 showed that the composition contained about 57% of its xanthate content in the form of acid xanthate groups. At a pH of 7.3 the viscose contained 56% of its xanthate content in the form of acid xanthate groups. Viscose which was decausticized to a pH of 8.1 was found to contain 17% of its xanthate content in the form of acid xanthate groups. On the other hand, viscose which was decausticized to a pH of 9.3 contained no free acid xanthate groups.

When the decausticized viscose samples taken at various pH levels are spray dried in the dryer described in Example 6 above, a stable, solid sodium cellulose xanthate powder is obtained.

In each case there is a slight loss in xanthate sulfur content of the product relative to the feed. This results from a partial decomposition of the xanthate. The viscose samples which correspond to viscose having all free alkali removed (pH of about 9.3) are spray dried most efficiently with a minimum decomposition of the xanthate. Viscose which has been neutralized to a lower pH is somewhat less stable and is preferably dried using higher velocity and lower temperature air. Viscose samples which have been neutralized to a pH in the range from 9.3 up to 13 are progressively less stable, with increasing pH of the solution, during the spray drying process. This is unexpected since the opposite is true with respect to the neutralized solution. The solutions decrease in stability with decrease in pH below pH 13.

In this range (pH 9–13), there is a more severe loss of xanthate sulfur. Nevertheless, with proper selection of temperature and air velocities in the spray dryer, spray dried products can be produced which are solid, stable and easily redissolved. Viscose, and other polymeric alcohol xanthate solutions having a pH above 13, cannot be spray dried without almost total loss of xanthate sulfur. In fact, attempts to dry viscose and other polymeric alcohol xanthates having a pH above 13 results in almost total regeneration of the cellulose or other polymeric alcohol therefrom. In such a case, the powdered product which is produced cannot be redissolved or redispersed and is lacking in all of the desirable properties found in the spray dried decausticized product.

Example 10

This example demonstrates that naturally occurring organic ion exchange materials can be used with substantially equal success in decausticizing viscose in preparation for drying.

An 8% cellulose content viscose as used in Example 1 was diluted to a 0.3% cellulose content with distilled water. The diluted viscose was slurried with bast fibers which had been acid treated to convert the ion exchange sites therein to the acid or hydrogen iron form. At the end of 10 min., the slurry was filtered and the dilute viscose was recovered as a light amber colored solution of cellulose xanthate having a pH of about 9.0.

The decausticized viscose thus prepared is fed into a spray dryer as described in Example 6 above. In the dryer the viscose is atomized and passed into a stream of heated air. The air has an inlet tempearture of 143° C. and an outlet temperature of 104° C.

The viscose spray is completely dried to produce a finely divided solid product which is stable on extended storage. The product is sodium cellulose xanthate in the form of hollow spheres ranging from submicron size up to balloons in the range of 30 to 60 microns in diameter.

Example 11

A series of experiments were carried out in spray drying decausticized viscose under a variety of feed conditions.

Viscose having a 7.7% cellulose content was decausticized to various pH levels in the range from about 6.5 to 12.3 using Amberlite IRC50 ion exchange resin in the acid or hydrogen ion form. The decausticized viscose was diluted to a 2% cellulose content and spray dried in a dryer of the type described in Example 6 above.

The spray dried powders obtained in each of the runs contained about 65% cellulose and about 4% water. The product was a free flowing powder which is stable for several weeks at temperatures just below room temperature. Under refrigeration, the powder is stable almost indefinitely. The sodium cellulose xanthate powder is very hygroscopic and must be protected against atmospheric moisture. The powders obtained in the various runs were further dried using various laboratory desiccants and also by extensive drying with bone dry air. Extensive drying with bone dry air has reduced the water content of the product to substantially less than 1%. The stability of the product is closely related to water content. The product tends to lose xanthate sulfur in the presence of moisture. The extremely dry product has a storage life of about six months or more at room temperature. In fact, the totally anhydrous product is stable even at moderately elevated temperatures for extended periods of time.

Example 12

An 8% amylose content solution of sodium amylose xanthate is prepared as described in Example 3, diluted to a 2% amylose content, and neutralized and decausticized by contact with an ion exchange resin in the acid form. Decausticized solutions of sodium amylose xanthate are produced in this manner at pH values ranging from 10.5 down to 7.6 or lower.

Decausticized solutions of sodium amylose xanthate prepared as described above are spray dried in a manner described in any of the previous examples. The solutions are preferably atomized into a stream of heated air having an inlet temperature of 143° C. and an outlet temperature of 102° C. The product obtained is a dry, stable, decausticized sodium amylose xanthate powder.

Example 13

A dilute solution of sodium polyvinyl alcohol xanthate is prepared as described in Example 4, decausticized to a pH of 8.0 by admixture with a cation exchange resin in the acid form, and spray dried as in the previous example. The product is a dry, stable powder of sodium polyvinyl alcohol xanthate and is easily dissolved or dispersed in water.

Sodium polyallyl alcohol xanthate solution is prepared as described in Example 5, decausticized, and spray dried as described above for the preparation of spray dried sodium amylose xanthate.

SPRAY DRYING OF POLYMERIC ALCOHOL XANTHATE SOLUTIONS DECAUSTICIZED BY ANION EXCHANGE

Viscose and similar polymeric alcohol xanthate solutions can be purified and decausticized by treatment with anion exchange material in a manner somewhat similar to the purification and decausticization using cation exchange resins. In the anion exchange treatment the material used is a strong-base or intermediate-base strength anion exchange resin in the salt form (non-hydroxyl form). When the viscose (or other xanthate) solution is contacted with an anion exchange resin in the salt form, the hydroxyl groups in the solution exchange with the ionizable salt groups on the resin. If the viscose solution is merely mixed with anion exchange resin, the hydroxyl groups from the solution will reach equilibrium with the salt groups ionized from the resin and there will be only a partial purification and decausticization of the solution. However, if the viscose (or other polymeric alcohol xanthate solution) is fed through a column containing the resin, a relatively high ion concentration gradient is maintained between the solution and the resin with the result that a substantially complete removal of hydroxyl ion from the solution is effected.

When an anion exchange resin is used in this manner for decausticizing viscose (or other polymeric alcohol xanthate solutions), it is effective not only to remove hydroxyl ions from the solution but also to remove the anions of contaminating by-products such as trithiocarbonates, mono- and dithiocarbonates, thiosulfates, perthiocarbonates, and sulfides which are produced as by-products in the xanthation process.

The treatment of viscose and similar solutions with anion exchange resins has the advantage of removing ionic by-products which tend to discolor the viscose but has the disadvantage of substituting the anion of the ion exchange resin for the hydroxyl ions in the solution with the result that the decausticized viscose contains an amount of sodium salts which is substantially equivalent to the alkali content of the viscose as initially formed. As a result, it is necessary to use anion exchange resins only in the form of salts of relatively strong acids so that the salt formed with the sodium ions is substantially neutral. In practice, the anion exchange process is preferably used to clean up a solution which has first been dialyzed or neutralized by cation exchange.

In carrying out the decausticization of polymeric alcohol xanthate solutions with anion exchange materials, any of the commercially available anion exchange resins can be used as well as naturally occurring materials which inherently possess anion exchange properties. Examples of anion exchange materials that can be used in the decausticization of polymeric alcohol xanthate solutions by anion exchange include but are not limited to the following: intermediate base anion exchangers, e.g., Dowex 2; strong base anion exchangers, e.g., De-Acidite FF, Amberlite IRA 400, Amberlite IRA 410, Dowex 1, Nalcite SAR; porous anion exchangers, e.g., Decolorite and Duolite S30, as well as naturally occurring anion exchangers, e.g., proteins containing ionizable amino groups, polymeric betains, etc.

The following non-limiting examples are illustrative of the decausticization of polymeric alcohol xanthates by anion exchange:

Example 14

A glass column having an I.D. of 1 cm. was filled to a depth of 20 cm. with 50-mesh Dowex 1X4 ion exchange resin in the chloride form.

An 8% cellulose content viscose was diluted to 0.5% cellulose content and fed through the column under a pressure of 0.5 p.s.i.g. at a rate of 1 ml./min. The effluent from the column had a substantially constant pH of 11.8 and was a clear, colorless liquid.

This procedure was repeated using the same apparatus filled with Dowex 1X8 resin in the chloride form and the product was a clear liquid having a substantially constant pH of 11.8.

The decausticized viscose produced as just described is fed through a spray dryer as described in Example 6. The solution is atomized into a heated air stream having an inlet temperature of 115° C. and an outlet temperature of 60° C. The product obtained is a dry stable almost white powder comprising sodium cellulose xanthate containing a small amount of sodium chloride.

When dilute viscose was passed through an anion exchange column using other anion exchange resins, including Dowex 2X4 (chloride form), Amberlite IRA 400 (nitrate form), and Nalcite SAR (nitrate form), a decausticized product was obtained as described above.

When the decausticized product is spray dried, the resulting product is a dry stable white powder containing a small amount of a sodium salt impurity resulting from the introduction of the anion from the exchange resin. The anion exchange step is particularly effective in removing colored sulfur by-products. These colored by-products can also be removed by aeration of a cold solution which has been purified or decausticized by dialysis or cation exchange.

When the above procedure is repeated using solutions of sodium amylose xanthate, sodium polyvinyl alcohol xanthate, or sodium polyallyl alcohol xanthate, the solutions are readily decausticized and can be spray dried as described above.

SPRAY DRYING OF POLYMERIC ALCOHOL XANTHATE SOLUTIONS DECAUSTICIZED BY ION RETARDATION

Ion retardation resins constitute a new class of materials similar to ion exchange resins. They are prepared by polymerizing a cationic monomer inside the pores of an anion exchange resin or an anionic monomer inside the pores of a cationic exchange resin. The resulting linear polymer is trapped inside the cross linked ion exchange resin and cannot diffuse out. The resin system is physically and chemically stable and comprises a mixture of cation and anion exchangers with the mixing taking place at the molecular level.

In an ion retardation resin anionic and cationic absorption sites are so closely associated that there is a partial neutralization of electrical charges in adjacent sites. However, the sites still have an attraction for mobile anions and cations and can associate with them to some extent. The result is that the resin will absorb both anions and cations from solutions with which it comes in contact, but the absorbed ions can be displaced from the resin by the use of water as an eluent. If the solution contains macromolecular ions, they cannot, in general, diffuse inside the resin beads, so a separation of small from large anions can take place. Ion retardation resins may be utilized in batch operations. However, since absorbed ions are only weakly held, their removal from solution is incomplete even in the presence of excess resin, and hence a column operation is generally preferred. In column operations, the solution to be treated is fed through the resin bed until the ion absorbing capacity of the bed is utilized as completely as possible. The absorbed ions are then eluted by rinsing the bed with water.

Example 15

In one experiment, a column of ion retardation resin was prepared using Retardion 11A8 (product of the Dow Chemical Company) which is a 50–100 mesh resinous material prepared by polymerizing acrylic acid inside Dowex 1 (a quaternary, strong base, styrene resin manufactured by the Dow Chemical Company). Before use, the resin was soaked in water to remove soluble impurities and to cause the resin to expand to its wet size. The preliminary washing of the resin is desirable to bring the resin bed to its full size and thus prevent variation in feed rate through the bed.

An 8% cellulose content (6% alkali) viscose was diluted to a 1% cellulose content for removal of alkali in the column. The dilute viscose was introduced into the top of the column and allowed to flow through by gravity. The eluent from the column had a pH of about 12 and was a clear colorless liquid. At a pH of 12, more than 99.9% of the free alkali in the viscose has been removed.

The recovery of the dilute viscose from the column was essentially quantitative and the decausticized product, substantially free of impurities, could be thermally regenerated into a coating or film.

When this decausticized solution is fed into a spray dryer as described and shown in FIG. 1, a spray-dried product is produced which is stable over extended periods of time. The dilute solution is fed into the dryer through the atomizing nozzle into an air stream having an inlet temperature of 121° C. and an outlet temperature of 60° C. The fine spray is quickly dried to produce a dry powder which is rapidly separated from the heated air before substantial decomposition of the xanthate can occur. The powder which is produced can be redissolved or redispersed in water or other substantially inert polar solvents and can be used as an adhesive for paper or wood or as a wet or dry strength additive in the manufacture of paper, or for treating textile fibers, yarns, or fabrics for providing soil resistance and anti-static properties to synthetic polymer fibers, for sizing cotton and rayon fabrics, and for binding together the fibers of nonwoven fabrics.

Example 16

A column of Retardion 11A8 resin is prepared as described in Example 15. An 8% amylose content solution of sodium amylose xanthate is prepared as described in Example 3 and diluted to a 1% amylose content solution. The dilute amylose xanthate solution is then allowed to flow by gravity through the resin bed. The effluent from the column has an average pH of about 12, which would represent substantially complete removal of all free alkali in the solution.

When this solution of decausticized sodium amylose xanthate is spray-dried using the dryer described in Example 6, a fine powder is obtain which is stable for extended periods of time at room temperature and almost indefinitely under refrigeration. The product can be redissolved or dispersed in water or other inert polar solvent and used as an adhesive or as a wet-dry strength additive in the manufacture of paper, or for treating textile fibers, yarns, or fabrics as described in the previous examples.

SPRAY-DRYING OF VISCOSE AND OTHER POLYMERIC ALCOHOL XANTHATE SOLUTIONS DECAUSTICIZED BY LIQUID ION EXCHANGERS

In some cases, the use of a liquid ion exchanger is advantageous in continuously decausticizing viscose (or other polymeric alcohol xanthate solutions) because the liquid exchange medium can be continuously removed and regenerated.

Example 17

A liquid ion exchanger was prepared by dissolving 20 g. of monolauryl acid orthophosphate in 50 ml. of carbon tetrachloride. A turbid dispersion was produced. A 250-ml. beaker was charged with 100 ml. of dilute (0.5% cellulose content) viscose and the liquid ion exchanger slowly added with stirring.

As the materials were mixed, spontaneous emulsion took place and the pH decreased slowly to pH 9. The mixture was centrifuged to break the emulsion and decausticized viscose (pH 9) recovered as a clear, amber liquid.

When viscose which has been decausticized using a liquid ion exchanger as above described is fed into a spray dryer as described in Example 6 above, a dry, stable powder is obtained. The solution is atomized into a heated air stream having an inlet temperature of 116° C. and an outlet temperature of 60° C. The dry powdered product is stable for extended storage at room temperature and almost indefinitely under refrigeration.

When the dry powder is redissolved to reconstitute a decausticized viscose solution, the resulting solution can be regenerated into cellulose film or fiber (by thermal or acid regeneration) and can be used as a high wet and dry strength size for paper, or for treating textile fibers, yarns, or fabrics for the purposes described in the previous examples.

The liquid ion exchange process used in decausticizing the viscose in preparation for spray-drying can be similarly used in the decausticizing of other polymeric alcohol xanthates. Other liquid ion exchangers (both anion and cation type), well known in the art, can be used in this process.

SPRAY-DRYING OF VARIOUS POLYMERIC ALCOHOL XANTHATE SOLUTIONS DECAUSTICIZED BY VARIOUS MULTI-STEP PROCESSES

While the several processes of dialysis, cation exchange, anion exchange, ion retardation, etc., described above, are effective in decausticizing polymeric alcohol xanthate solutions, these processes are effective and in some cases more efficient when used in conjunction with one another. Thus, cation and anion exchange resins can be used for sequential treatment of various xanthate solutions, and mixtures of resins in the form of a mixed bed can similarly be used. Also, a combination of dialysis with cation or anion exchange is especially effective in decausticizing the various polymeric alcohol xanthate solutions. The decausticized solutions prepared by any such process can be spray-dried to produce exceptionally stable dry powdered materials.

Example 18

A 4% amylose-content, amylose xanthate solution was prepared as described in Example 3. About 100 g. of solution was placed in a regenerated cellulose bag and dialyzed by shaking the bag in 1.5 liters of water in a polyethylene bottle at 320 cycles per minute. The water was changed twice at 20-minute intervals; then it was changed again and the system left standing at 25° C. overnight.

The amylose xanthate solution was recovered from the dialysis bag as a viscous liquid having a pH of 11.5. The dialyzed solution (pH 11.5) recovered from the dialysis bag was mixed with Amberlite IRC 50H resin to remove additional sodium ions therefrom. The solution was separated from the exchange resin and found to have a pH of 6.5.

When the dialyzed and ion exchanged solution is spray-dried in the apparatus descrbied in Example 6 above, using an air inlet temperature of about 127° C. and an outlet temperature of 66° C., a stable, solid, dry powder is obtained.

When the spray-dried powder is redissolved, a reconstituted amylose xanthate solution (pH 6.5) is obtained which is quite viscous and can be regenerated to produce a film or filament by acid treatment or by thermal regeneration.

Example 19

A 1% cellulose content viscose was subjected to dialysis as described in Examples 1 to 3 to produce a decausticized product having a pH of about 12. The decaustized viscose was then mixed with a cation exchange resin, Amberlite IR 120H, to further remove sodium ions therefrom. The solution which was recovered from admixture with the resin was a viscous, light-amber-colored solution of decausticized cellulose xanthate having a pH of about 6.

When this decausticized cellulose xanthate is spray-dried as described in Example 18, a dry, stable powder is obtained. As previously described, the spray-dried powder may be redissolved to produce a solution which is useful in the preparation of regenerated cellulose films or fibers or as a wet or dry strength size for paper, or for treating textile fibers, yarns, or fabrics as previously described.

Example 20

A 1% cellulose content viscose is subjected to dialysis as described in Examples 1 to 3 to produce a decausticized product having a pH of about 12. The decausticized viscose is then mixed with a cation exchange resin, Zeo-Karb 226, to further remove sodium ions therefrom. The solution which is recovered from admixture with the resin is a viscous, light-amber-colored solution of decausticized cellulose xanthate having a pH of about 6.

When this decausticized cellulose xanthate is spray-dried as described in Example 18, a dry, stable powder is obtained. As previously described, the spray-dried powder may be dedissolved to produce a solution which is useful in the preparation of regenerated cellulose films or fibers or as a wet or dry strength size for paper, or for treating textile fibers, yarns, or fabrics as described in the previous examples.

Example 21

A 0.5% cellulose content viscose solution, freshly diluted, is fed through a column of Dowex 1X4 resin in the chloride form. A colorless effluent is recovered from the column having a pH slightly in excess of 12. The sulfur by-products in the viscose are removed in the form of a carrot-colored band near the top of the resin bed.

The effluent from the anion exchange column is then passed through a column containing Amberlite IRC 50H cation exchange resin to yield a colorless, odorless effluent. The solution recovered from the cation exchange column has an initial pH of 7.6.

When the pH 7.6 solution is spray-dried as described in Example 18, there is produced a stable, dry powder. This powder can be redissolved in water to produce a cellulose xanthate solution free of alkali and sulfur by-products which can be thermally regenerated or regenerate by acid treatment to produce films or fibers. The cellulose xanthate solution can also be used as a wet or dry strength additive for paper, or for treating textile fibers, yarns, or fabrics as described in the previous examples.

Example 22

A 1% cellulose content viscose solution, freshly diluted, is neutralized to pH 10 by admixture with Amberlite IRC 50H resin. The mixture is filtered to recover a fawn colored solution of cellulose xanthate.

The cation exchanged solution is then mixed with Dowex 1X4 anion exchange resin for a period of about 10 minutes. The solution which is recovered from the anion exchange resin is clear, colorless, and odorless, having a pH of about 10. The color-forming and odor-forming impurities are removed during the anion exchange treatment.

When the product solution is spray-dried as described in Example 18, there is produced a stable, dry, solid product. The dry powder which is produced is stable for extended periods of time at room temperature and almost indefinitely under refrigeration. As described in the previous examples, the spray-dried decausticized cellulose xanthate can be redissolved to produce solutions which are useful in the formation of films or fibers or as wet strength or dry strength additives for paper, or for treating textile fibers, yarns, or fabrics as described in the previous examples.

Example 23

In another experiment, a mixed bed ion exchange resin was prepared by mixing about 15 g. of Amberlite IRC 50H cation exchange resin with 13 g. of Dowex 1XC1 anion resin. The mixed resin was added to 150 ml. of 1% cellulose content diluted viscose and stirred for ten minutes. The supernatant solution which was recovered was a clear, colorless solution having a pH of 7.2.

When this solution is spray-dried as described in Example 18, a dry, solid powder is obtained which is stable for extended periods of time at room temperature and almost indefinitely under refrigeration. As previously described, the spray-dried cellulose xanthate powder may be redissolved to produce a solution which can be used in forming regenerated cellulose films or fibers or as a wet or dry strength additive for paper, or for treating textile fibers, yarns, or fabrics as described in the previous examples.

USE OF DECAUSTICIZED POLYMERIC ALCOHOL XANTHATE POWDERS AND SOLUTIONS RECONSTITUTED THEREFROM IN TREATMENT OF TEXTILE FIBERS

Decausticized viscose and other decausticized polymeric alcohol xanthates are useful for a variety of purposes for which the caustic-containing materials would have little or no application. For example, the decausticized solutions are easily regenerated by application of heat with no alkaline by-product formation. Also, the decausticized solutions can be used for treatment of textile fibers which would be sensitive to the alkali in the caustic-containing xanthate solutions.

The decausticization of polymeric alcohol xanthate solutions reduces considerably the formation of by-product materials upon regeneration of the polymeric alcohol. The decausticized polymeric alcohol xanthate solutions can be regenerated by treatment with acid, as can the caustic or unpurified materials. However, the decausticized solutions can be regenerated by treatment with acid to produce regenerated materials having a much lower proportion of by-products than materials regenerated from unpurified solutions. Furthermore, the decausticized xanthate solutions can be regenerated thermally to produce products which are largely free of by-product materials. The thermal regeneration of decausticized xanthate solutions is especially desirable in the treatment of textile fibers since this procedure is much simpler than acid regeneration procedure.

The decausticized solutions are somewhat unstable thermally and tend to gel upon storage for an extended period of time. When the solutions are spray-dried, as described above, the dry, solid powder which is produced is stable at room temperature for extended preiods of time and almost indefinitely under refrigeration. When the stable, solid decausticized xanthate powder is redissolved, solutions are obtained which are substantially the same as the decausticized solutions prior to spray drying and which are useful in the treatment of textile fibers, yarns, and fabrics, and in the preparation of non-woven fabrics.

The follwing examples illustrate the various techniques for treatment of textile fibers in accordance with this invention:

Example 24

A cotton fabric is passed through a solution of decausticized sodium cellulose xanthate having a 1.5% cellulose concentration and a pH of about 9.5 when freshly made. This solution may be made by decausticization of a dilute viscose or by redissolving a decausticized cellulose xanthate powder prepared in accordance with any of the aforementioned examples.

The fabric is passed through the xanthate solution and saturated to about a 150% liquid pickup. The solution penetrates the cotton fabric readily. The fabric is passed through an ordinary washing machine wringer to remove excess solution. The fabric is then dried in an oven under air circulation at 105° C. for about 30 minutes. Under these conditions the fabric has 2% regenerated cellulose addon based on the dry weight of fabric. The fabric which is prepared in this manner is found to have superior soil resistance and is more highly resistant to wrinkling and creasing than is the untreated fabric. Also, if the fabric is creased prior to drying in the oven, a permanent crease is produced therein.

Example 25

In this example, the procedure of Example 24 is repeated except that an acetate rayon fabric is substituted for the cotton fabric. The coated fabric which is obtained after drying is more resistant to soil and to wrinkling than is the untreated fabric. Also, the treated fabric is less sensitive to heat damage, as from a hot iron, than is the untreated or uncoated fabric.

Example 26

A white nylon fabric is treated in accordance with the procedure described in the previous examples. The nylon fabric is dipped in a solution of pH 9.5 decausticized sodium cellulose xanthate (2.5% cellulose content), squeezed in a nip roll, and dried as previously described. The fabric has a 2.5% cellulose addon. The nylon fabric which is coated with regenerated cellulose is found to have an increased resistance to soil, to oil or grease staining, and has exceptionally good anti-static properties. The regenerated cellulose coated nylon fabric is almost entirely free of static electricity upon friction, while the untreated fabric will build up a substantial static charge. This treatment is especially useful in providing anti-static protection to nylon fabrics of the type used in automobile seat covers.

Example 27

A Dacron polyester fabric is treated with a decausticized cellulose xanthate solution in accordance with this invention. The Dacron fabric is passed through a solution of pH 10 sodium cellulose xanthate, having a 2.5% cellulose content, as described in Example 26. The fabric is passed through nip rolls to remove excess solution and dried at 105° C. for about 30 minutes in an oven. The fabric has a 2.5% cellulose addon.

The cellulose-coated Dacron fabric which is produced in accordance with this procedure is essentially free of static electricity upon ordinary friction. This treatment is especially useful in connection with Dacron fabrics of the type used for automobile seat covers and also for other fabric applications where static electricity is a substantial problem. The regenerated cellulose coating is quite adherent to the Dacron polyester fabric but can be removed by exceptionally severe abrasion as is encountered sometimes in severe wash cycles. The loss of the regenerated cellulose coating on the Dacron fabric during washing can be avoided by incorporating about 10–50% by wt. (based on the cellulose xanthate in the solution) of a reactive adhesive such as an epoxy polymer (e.g. Kymene 557) or a diisocyanate in the cellulose xanthate treating solution. The diisocyanate used may be any of several commercial diisocyanates which are either water soluble or may be emulsified into the cellulose xanthate solution. Typical diisocyanates which may used include diphenylene diisocyanate, tolylene diisocyanate, dianisidine, diisocyanate, DDI 1410 (the diisocyanate of dimerized linoleic acid), etc. The diisocyanate may be water soluble, or emulsifiable into the xanthate solution, or provided in an emulsion in a water immiscible solvent. Blocked diisocyanates, such as phenol blocked tolylene diisocyanate, and blocked isocyanate ended polymer latices and solutions may be used. The incorporation of the diisocyanate produces an improved adhesion of the regenerated cellulose to the fabric being treated. The diisocyanate treatment may, if desired, be applied as a separate step as by saturating the fabric with the diisocyanate prior to application of the decausticized cellulose xanthate solution. This incorporation of a diisocyanate for improved adhesion of the cellulose xanthate coating to the fabric may be used in any of the various treatments of fabrics described in this specification. The epoxy adhesives Kymene 557 is a water soluble, polymeric polyepoxide which is the reaction product of epichlorohydran and a polyamide prepared by reacting adipic acid with diethylenetriamine. This polyepoxide is manufactured by Hercules Powder Company, Wilmington, Delaware.

Example 28

A series of experiments were carried out in which a nylon taffeta fabric, Dacron taffeta fabric, and nylon net fabric were coated with cellulose from decausticized cellulose xanthate solutions at a 0.3% cellulose addon and measured for anti-static properties against control fabrics. The fabrics were treated, as described in previous examples, by immersion in a solution of decausticized sodium cellulose xanthate and dried to regenerate cellulose coatings on the fiber of the fabrics at the desired cellulose addon. The samples were evaluated using a Rothschild static voltameter. The static evaluation was carried out at room temperature and a 65% relative humidity. The coated fabrics and untreated controls were evaluated for dissipation of static electric charges, both before washing, and after one wash. The results of these experiments are set forth in Table I below.

TABLE I

| Sample | Before washing | | After one wash | |
| --- | --- | --- | --- | --- |
| | Initial charge, volts | Charge after 1 min., volts | Initial charge, volts | Charge after 1 min., volts |
| Nylon taffeta (control) | 606 | 332 | 425 | 243 |
| Nylon taffeta +0.3% cellulose coating | 685 | 20 | 538 | 0 |
| Dacron taffeta (control) | 160 | 15 | 360 | 320 |
| Dacron taffeta +0.3% cellulose coating | 192 | 0 | 200 | 0 |
| Nylon net (control) | 170 | 131 | 276 | 228 |
| Nylon net+0.3% cellulose coating | 139 | 0 | 280 | 0 |

From the above table, it is noted that a cellulose coating on nylon or Dacron fabrics, at a 0.3% cellulose addon, produces a very substantial anti-static effect in the fabrics as measured by static charge dissipation. Somewhat lesser but significant anti-static effects are obtained with cellulose coatings at addons down to 0.3%. It is believed that some anti-static effect could be obtained at even lower loadings, but data have not been obtained for such low addons.

Example 29

A fabric comprising 65% Dacron polyester fiber and 35% cotton is treated as described in Examples 27 and 28 above, both with and without the addition of a diisocyanate as a supplemental adhesive for the cellulose coating. The fabric is dipped into solutions of decausticized cellulose xanthate at various cellulose concentrations ranging from 0.1–3.0%. The amount of solution pickup is about 100% of the weight of the fabric and so the amount of cellulose coating corresponds approximately to the cellulose content of the solution. After drying, it is found that the fabrics exhibit exceptionally good anti-static properties and are especially resistant to permanent soiling.

Example 30

A series of experiments were carried out in which Orlon polyacrylic fibers were formed into nonwoven handsheets and treated with solutions of decausticized sodium cellulose xanthate and cellulose regenerated in the handsheets to produce a nonwoven fabric bonded with regenerated cellulose. The hand-sheets which were prepared were about 4 mils in thickness and were treated with solutions of decausticized sodium cellulose xanthate to produce cellulose addons in the fabrics in the range from 1.0–4.0%. In Table II the Orlon nonwoven fabrics thus prepared were compared with a control nonwoven web having no regenerated cellulose binder. In Table II data are given for percent elongation and break strength in pounds per square inch both in the longitudinal and transverse direction for the nonwoven webs, both on a dry and rewet bases.

TABLE II.—ORLON NONWOVEN HANDSHEETS

| Sample No. | Dry tensile data | | | | Rewet tensile data | | | |
|---|---|---|---|---|---|---|---|---|
| | Percent Elongation | | Break strength (p.s.i.) | | Percent Elongation | | Break strength (p.s.i.) | |
| | L | T | L | T | L | T | L | T |
| 1 | 1.4 | 1.5 | 555 | 363 | 0 | 0 | 0 | 0 |
| 2 | 2.5 | 2.5 | 956 | 903 | 1.3 | 1.7 | 339 | 318 |
| 3 | 3.9 | 4.2 | 1,529 | 1,308 | 1.8 | 2.3 | 552 | 554 |
| 4 | 7.6 | 6.3 | 1,910 | 1,297 | 2.3 | 2.6 | 702 | 556 |
| 5 | 8.6 | 8.8 | 1,844 | 1,719 | 2.8 | 3.6 | 809 | 827 |

L=Longitudinal; T=Transverse. 1=Control; 2=1% cellulose addon; 3=2% cellulose addon; 4=3% cellulose addon; 5=4% cellulose addon.

From the data set forth in the table above, it is seen that an untreated web of Orlon fibers has very low dry tensile strength and no rewet strength. Under rewet conditions, the web is not of sufficient strength to bear its own weight. From the data in the table, it is seen that there is a substantial increase in tensile strength, both dry and rewet, and in percent elongation at break, for the various nonwoven Orlon fabrics as the cellulose binder addon was increased from 1% up to 4% based on the fiber weight.

When nonwoven handsheets of various fibers, including nylon, cellulose acetate, Velon (polyvinylidene chloride), saran (polyvinylidene chloride alone or copolymerized with polyvinyl chloride or polyacrylonitrile), Dacron (polyester fiber), Fiberglas (spun glass fibers), etc., are treated with solutions of decausticized sodium cellulose xanthate and regenerated cellulose formed in the hand-sheets by acid regeneration or by simple drying under air circulation at a temperature of 70 to about 150° C., nonwoven fabrics are obtained which have excellent tensile and handling properties. A similar effect is obtained when fibers are formed into handsheets and impregnated with other decausticized polymeric alcohol xanthate solutions, as described above, and the polymeric alcohol regenerated as a coating or binder on the fibers.

Example 31

The formation of nonwoven fabrics in accordance with this invention is also carried out in commercial machinery for the manufacture of such fabrics. Textile fibers of any of the types mentioned in the previous examples are chopped in fiber lengths of about 1¼–1½ in. The fibers are fed through a Rando-Feeder which opens and spreads the fibers in preparation for the formation of a nonwoven web. The Rando-Feeder is positioned to discharge the fibers to a Rando-Webber where the fibers are formed as a randomly oriented nonwoven web. The web which is formed is treated with a binder solution consisting of a 3.0% solution of decausticized sodium cellulose xanthate which is sprayed onto the web and subsequently regenerated by passing through an oven where the cellulose is regenerated and by-products removed. The web which is formed is bound together by regenerated cellulose and is of a quality and strength equivalent to nonwoven webs produced by other well known commercial processes. This procedure has the advantage of using a binder which is water soluble and which is regenerated simply by heating and drying. The decausticized solution is easy to handle, easy to regenerate, and does not attack the various fibers which would react with the strong alkali present in viscose.

While the process of preparing nonwoven fabrics has been described with reference to a handsheet or a web formed using Rando-Webber and Rando-Feeder machines, the process is equally applicable to the preparation of nonwoven fabrics using air-lay machines, wet-lay machines, and other web-forming machinery and the binder solution may be applied by saturating or by spraying. While the process has been described with reference to the formation of relatively thin nonwoven fabrics, it is equally applicable to the preparation of thick porous fabrics of the type used for cushioning or padding materials.

While this invention has been described with special emphasis upon several preferred embodiments, it should be understood that the process described herein is equally applicable to the treatment of various textile fabrics and the preparation of various nonwoven fabrics using any of the decausticized polymeric alcohol xanthate solutions (either as originally prepared or as reconstituted from the spray-dried powders) followed by thermal or acid regeneration or by precipitation of the xanthide by oxidation or by treatment with a polyvalent metal cation.

What is claimed is:

1. A method of treating textile fibers which comprises contacting cotton fibers or synthetic fibers with a decausticized solution of a polymeric alcohol xanthate having a pH less than 13 and being substantially free of salts derived from free alkali in the solution, and treating the fibers to insolubilize a polymeric coating from the solution on the fibers.

2. A method in accordance with claim 1 in which the treated fibers are heated to regenerate a polymeric alcohol coating thereon.

3. A method in accordance with claim 1 in which the xanthate solution is a decausticized viscose, amylose xanthate, starch xanthate, polyvinyl alcohol xanthate, or polyallyl alcohol xanthate.

4. A method in accordance with claim 1 in which the xanthate solution is reconstituted from a dry powder produced by spray drying a decausticized viscose, amylose xanthate, starch xanthate, polyvinyl alcohol xanthate, or polyallyl alcohol xanthate solution.

5. A method in accordance with claim 1 in which the decausticized xanthate solution is applied to a woven fabric of said textile fibers.

6. A method in accordance with claim 1 in which the xanthate solution is applied to a nonwoven web of said textile fibers and insolubilized to bind said fibers as a nonwoven fabric.

7. A method in accordance with claim 1 in which the fibers are pretreated with an epoxy or isocyanate adhesive.

8. A method in accordance with claim 1 in which the decausticized xanthate solution is applied in admixture with an epoxy or isocyanate adhesive.

9. A method in accordance with claim 1 in which the textile fibers are cotton, rayon, cellulose ether fibers, cellulose ester fibers, nylon, polyester fibers, acrylic fibers, glass fibers, or mixtures thereof.

10. A textile product produced in accordance with claim 1.

11. A textile product produced in accordance with claim 3.

12. A textile product produced in accordance with claim 5.

13. A textile product produced in accordance with claim 6.

14. A textile product produced in accordance with claim 7.

15. A textile product produced in accordance with claim 8.

16. A textile product produced in accordance with claim 9.

References Cited

UNITED STATES PATENTS

| | | | |
|---|---|---|---|
| Re. 22,489 | 5/1944 | Schlosser et al. | 260—217 |
| Re. 23,013 | 6/1948 | Schlosser et al. | 260—217 |
| 1,852,466 | 4/1932 | McConnell | 260—218 |
| 1,955,092 | 4/1934 | Richter | 260—217 |
| 1,974,755 | 9/1934 | Schur | 260—218 |
| 2,011,156 | 8/1935 | Nelson et al. | 117—157 |
| 2,045,349 | 6/1936 | Goodman | 117—86 |
| 2,045,410 | 6/1936 | Richter et al. | 117—86 |
| 2,249,514 | 7/1941 | Berg et al. | |
| 2,422,573 | 6/1947 | Lilienfeld | 117—166 |
| 2,502,782 | 4/1950 | Erickson | 117—157 |
| 2,528,099 | 10/1950 | Wilcox et al. | 210—263 |
| 2,572,848 | 10/1951 | Fitch | 210—263 |
| 2,663,989 | 12/1953 | Schlatter et al. | 117—166 X |
| 2,733,998 | 2/1956 | Russell et al. | |
| 2,805,196 | 9/1957 | Roebersen et al. | 204—151 |
| 2,825,655 | 3/1958 | Meadows | 260—216 |
| 2,876,136 | 3/1959 | Ford. | |
| 2,910,380 | 10/1959 | Shiner | 117—157 |
| 3,093,502 | 6/1963 | Drelich | 117—166 X |
| 3,135,613 | 6/1964 | Underwood | 117—157 |
| 3,284,233 | 11/1966 | Sexsmith | 117—166 X |
| 3,335,023 | 8/1967 | Bridgeford. | |

WILLIAM D. MARTIN, *Primary Examiner.*

M. LUSIGNAN, *Assistant Examiner.*

U.S. Cl. X.R.

117—76, 126, 138.8, 139.5, 140, 143, 144, 147, 154, 161, 165, 166

UNITED STATES PATENT OFFICE
CERTIFICATE OF CORRECTION

Patent No. 3,450,555            Dated June 17, 1969

Inventor(s) Douglas J. Bridgeford

It is certified that error appears in the above-identified patent and that said Letters Patent are hereby corrected as shown below:

Col. 2, line 28, change "decompse" to --decompose--.

Col. 3, line 3, change "valume" to --volume--; and line 50, change "2690" to --269--.

Col. 5, line 73, change "viscose" to --viscous--.

Col. 6, line 1, change "ripering" to --ripening--;

line 13, change "Xanthate" to --xanthate--;

line 15, change "aobut" to --about--;

line 23, after "2" insert --is--; and line 35, change "nonwove" to --nonwoven--.

Col. 7, line 5, change "in" to --in.--.

Col. 8, line 29, change "oreder" to --order--.

Col. 10, line 14, change "ps.i.g." to --p.s.i.g.--;

line 18, change "other" to --another--; and line 29, change "other" to --another--.

Col. 11, line 31, change "Amberlie" to --Amberlite--.

Col. 12, line 10, change "iron" to --ion--.

Col. 15, line 54, change "obtain" to --obtained--.

Col. 16, line 62, change "descrbied" to --described--.

UNITED STATES PATENT OFFICE
CERTIFICATE OF CORRECTION

Patent No. 3,450,555  Dated June 17, 1969

Inventor(s) Douglas J. Bridgeford  PAGE - 2

It is certified that error appears in the above-identified patent and that said Letters Patent are hereby corrected as shown below:

Col. 17, line 27, change "dedissolved" to --redissolved--; an lines 50 and 51, change "regenerate" (second occurrence) to --regenerated--.

Col. 19, line 55, change "removel" to --removed--; and line 67, delete comma (last occurrence).

Col. 20, line 8, change "adhesives" to --adhesive--.

Signed and sealed this 27th day of June 1972.

(SEAL)
Attest:

EDWARD M. FLETCHER, JR.
Attesting Officer

ROBERT GOTTSCHALK
Commissioner of Patents